F. HUMPHRIS.
CONSTRUCTION OF ADJUSTABLE SPANNERS, WRENCHES, VISES, CLAMPS, PIPE CUTTERS, PIPE GRIPS, AND LIKE TOOLS.
APPLICATION FILED JULY 17, 1919.

1,343,826.

Patented June 15, 1920.

WITNESSES

INVENTOR
Frank Humphris
By James L. Norris
ATTORNEY

F. HUMPHRIS.
CONSTRUCTION OF ADJUSTABLE SPANNERS, WRENCHES, VISES, CLAMPS, PIPE CUTTERS, PIPE GRIPS, AND LIKE TOOLS.
APPLICATION FILED JULY 17, 1919.
1,343,826.
Patented June 15, 1920.
3 SHEETS—SHEET 2.
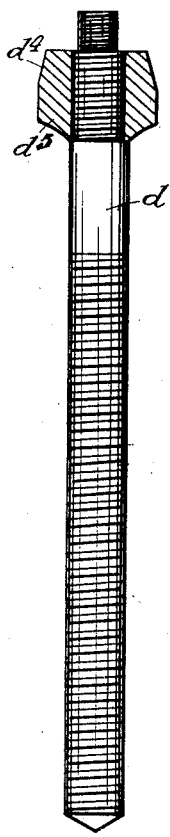
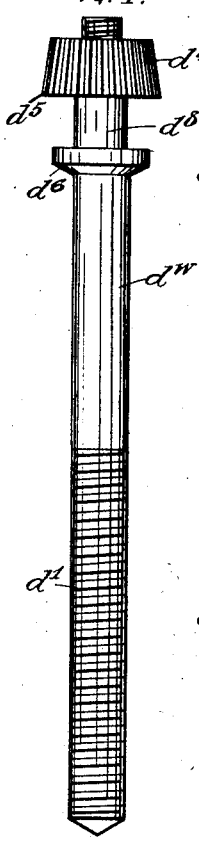
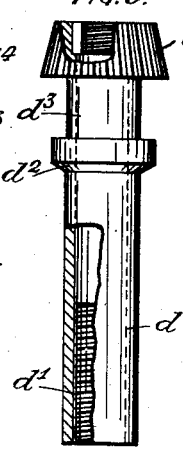
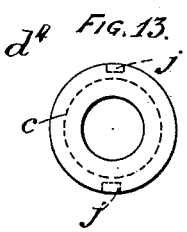
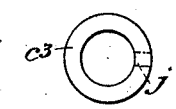
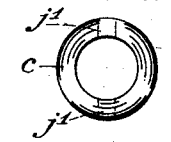
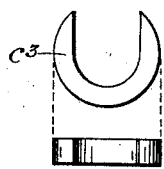
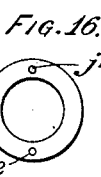
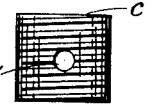
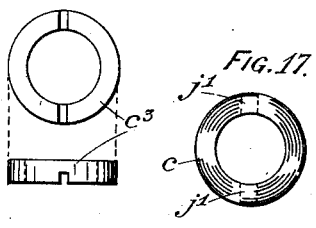
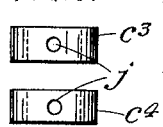
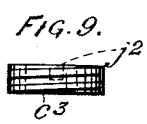
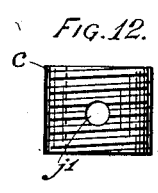
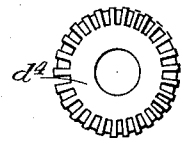
WITNESSES
INVENTOR
Frank Humphris
by
ATTORNEY F. HUMPHRIS.
CONSTRUCTION OF ADJUSTABLE SPANNERS, WRENCHES, VISES, CLAMPS, PIPE CUTTERS, PIPE GRIPS, AND LIKE TOOLS.
APPLICATION FILED JULY 17, 1919.
1,343,826. Patented June 15, 1920.
3 SHEETS—SHEET 3.
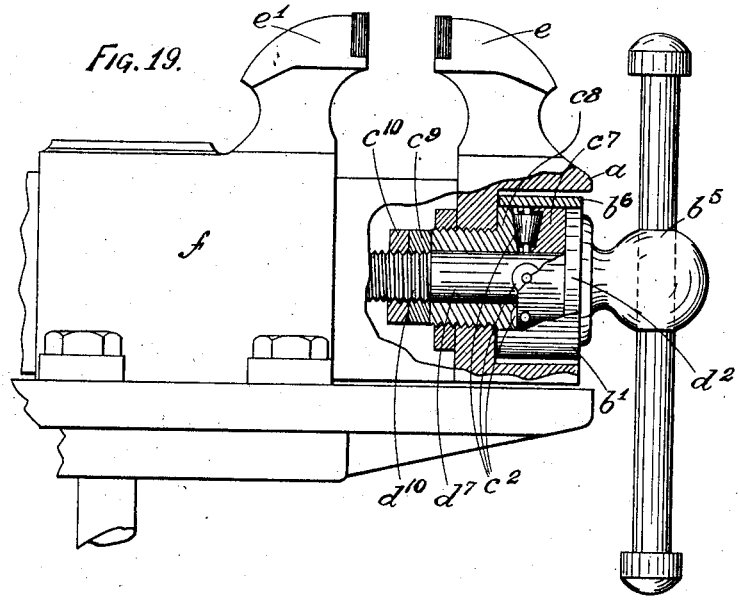
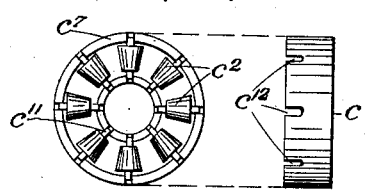
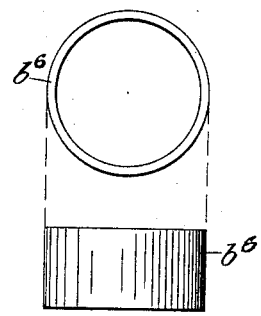
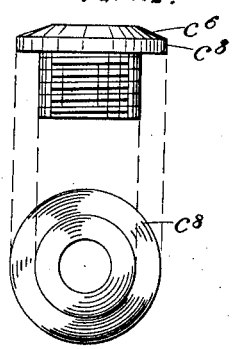
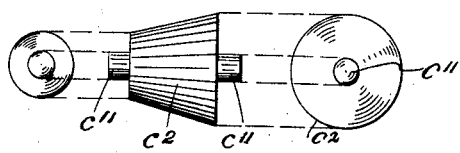
WITNESSES:
INVENTOR
Frank Humphris
By
ATTORNEY

UNITED STATES PATENT OFFICE.

FRANK HUMPHRIS, OF BOSCOMBE, ENGLAND.

CONSTRUCTION OF ADJUSTABLE SPANNERS, WRENCHES, VISES, CLAMPS, PIPE-CUTTERS, PIPE-GRIPS, AND LIKE TOOLS.

1,343,826.      Specification of Letters Patent.     Patented June 15, 1920.

Application filed July 17, 1919. Serial No. 311,677.

*To all whom it may concern:*

Be it known that I, FRANK HUMPHRIS, a subject of the King of Great Britain, residing at Boscombe, England, have invented a new and useful Improved Construction of Adjustable Spanners, Wrenches, Vises, Clamps, Pipe-Cutters, Pipe-Grips, and like Tools, of which the following is a specification.

The present invention relates to adjustable spanners, wrenches, vises, clamps, pipe-cutters, pipe-grips, and like tools and the main object thereof is to enable the tool to be gripped on or applied to the work with greater pressure in relation to the force applied than is feasible with such tools as heretofore constructed.

According to the said invention a ball or roller bearing is provided between the parts relative movement of which operates the movable jaw of the tool. The interposition of the ball or roller bearing between the said parts enables it to take the thrust or pressure caused by applying or gripping the tool to or on the work and thus greatly assists the functions of the jaws of the tool. The ball or roller bearing is preferably arranged in the handle of the tool in the case of an adjustable spanner, pipe-cutter, pipe-grip or similar tool and the balls or rollers of the said bearing are conveniently disposed between chases or races on an enlarged part of the rotatory member operating the movable jaw of the tool and a fixed collar or ring respectively, means being provided for adjusting and locking in position the said member relatively to the said collar or ring.

In order that the said invention may be clearly understood and readily carried into effect it is hereinafter particularly described with reference to the accompanying drawings which illustrate various convenient forms of the invention embodied in pipe-grips, adjustable spanners and vises but it is to be understood that these forms are examples only and the invention may be embodied in other like tools and the details may be varied to suit the particular tool or according to requirements or circumstances.

Fig. 3 is a side view of the solid screw-threaded spindle or shaft hereinafter described and shown in Fig. 2.

Fig. 4 is a side view of a modified form of the solid screw-threaded spindle or shaft that may be employed in devices as shown in Figs. 1 and 2.

Fig. 5 is a side view of the hollow screw-threaded spindle or shaft hereinafter described, as shown in Fig. 1.

Fig. 6 is a side view of the screw-threaded and collared ball-bearing-ring shown in Fig. 2.

Fig. 7 is a side view of the plain thrust and lock rings shown in Fig. 2.

Fig. 8 is a side view of the screw-threaded ball bearing ring of the kind suitable for the shaft shown in Fig. 4.

Fig. 9 is a side view of the plain thrust ring of the kind suitable for the shaft shown in Fig. 4.

Fig. 10 is a face view and side view of a C-form plain thrust ring of the kind used in connection with the spindle or shaft shown in Fig. 5.

Fig. 11 is a face view and side view of a broken annular form of plain thrust ring of the kind used in connection with the spindle or shaft shown in Fig. 5, and shown in section in Fig. 1.

Fig. 12 is a side view of the screw-threaded ball-bearing ring of the kind suitable for the hollow shaft shown in Fig. 5, and in section in Fig. 1.

Fig. 13 is a face view of the screw-threaded and collared ball-bearing ring of the kind shown in Fig. 6.

Fig. 14 is a face view of the round plain rings as shown in Fig. 7.

Fig. 15 is a face view of the screw-threaded ball-bearing ring shown in Fig. 8.

Fig. 16 is a face view of the plain thrust-ring shown in Fig. 9.

Fig. 17 is a face view of the screw-threaded ball-bearing ring of the kind shown in Fig. 12.

Fig. 18 is a face view of the knurled or serrated ends of the coned parts of the screw-threaded shafts or spindles, as shown in section in Figs. 1 and 3, and side view in Figs. 2, 4 and 5.

Fig. 19 is a side view partly in section of one form of an adjustable bench vise comprising a roller-thrust friction-reducing device according to this invention.

Fig. 20 is a face view and side view of a roller thrust-bearing, cage and rollers as shown partly in section in Fig. 19.

Fig. 21 is a side view and underside face view of a screw-threaded, collared and tapered roller-bearing ring of the kind shown partly in section in Fig. 19.

Fig. 22 is a face view and a side view of a cylindrically formed extension, part, or protecting cover-piece as shown partly in section in Fig. 19.

Fig. 23 shows end and side views, enlarged, of a roller of the kind shown in Figs. 19 and 20.

In the following description the parts of the said drawings are referred to by the letters and numerals marked thereon the same letters and numerals indicating the same or like or equivalent parts in all the figures of the drawings.

Figure 1:
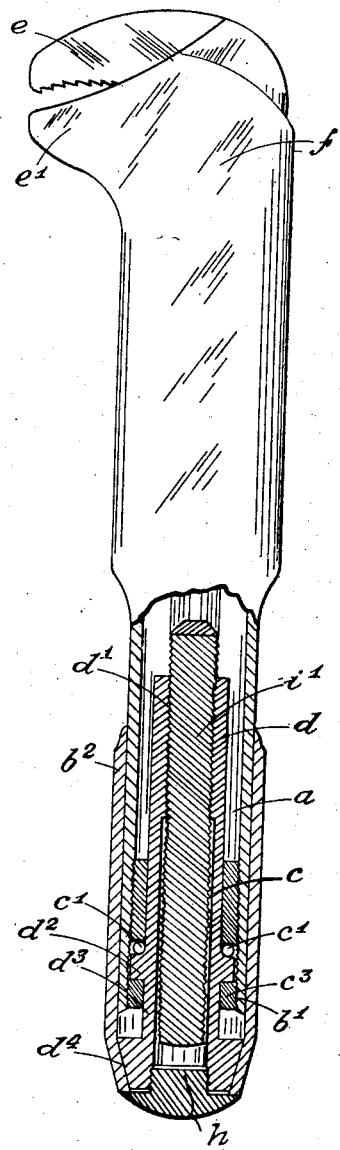
Figure 1 is a side view partly in section of an adjustable pipe-grip embodying one form of the said invention.

Referring to Fig. 1 which illustrates an adjustable pipe-grip:—$f$ is the body of the tool, $e'$ is the fixed jaw and $e$ is the movable jaw. $b'$ is a hollow cylindrical extension of the body $f$ having within it the concentric space or recess $a$ and constituting the handle part of the tool. Around the said part $b'$ is arranged the tubular cover-piece $b^2$ constituting the grip of the handle and capable of rotation on the said part $b'$. The said grip $b^2$ serves to exclude dirt and the like from the ball-bearing and operative screw devices situated within the recess $a$ and takes the place of a long adjusting screw nut thereby enabling the whole of the hand to be used when gripping the tool on the work. $i'$ is a screw-threaded extension or shank of the movable jaw which is shiftable within the body and operable by the adjusting means therefor. $d$ is a screw-threaded member by the rotation of which the movable jaw is operated, the said member in this case consisting of a hollow spindle having an internal screw thread $d'$ engaging with the screw thread on the part $i'$. $d^2$ is a collar or enlargement on the member $d$ and $c$ is a collar or ring screwed into the recess $a$. These parts are formed with chases or races for the balls $c'$ between them, and the ring $c$ is secured in such a manner as to insure it against the slightest rotary and independent longitudinal movement when in correct working position but which will leave the said ring free to be adjusted by means of a suitable tool when the parts of the tool are being assembled. $c^3$ is a ring nut screwed into the recess $a$ bearing against the enlargement $d^2$ to retain it in correct working position relatively to the balls $c'$ the said ring being adjustable but secured in such manner as to insure it against partial rotary and longitudinal independent movement. To provide for adjustment of the ring $c$ and ring nut $c^3$, holes $j'$ (see Figs. 12 and 17) and recesses $j^2$ (see Figs. 9 and 16) are provided respectively the holes $j'$ being designed for use with a bifurcated spring tool to be used within the bore of the ring $c$. Where as in the case of a spanner for use with ordinary screw nuts or a pipe-cutter or pipe-grip the tool is only designed to grip the work between the jaws the adjacent bearing faces of the ring nut $c^3$ and enlargement $d^2$ may be plain as shown in Fig. 1 and where the gripping pressure is taken between those parts only they are provided with chasers or races and balls interposed and the adjacent bearing faces of the ring $c$ and enlargement $d^2$ may be plain and where the jaws of the tool are to grip work both inwardly and outwardly ball bearings may be provided on both sides of the enlargement $d^2$. Where the ring nut $c^3$ takes the opening thrust of the jaws only it is preferred to make it in C-form as shown in Fig. 10 or as a divided or broken ring as shown in Fig. 11 so as to allow it to be placed over the waist part $d^3$ of the member $d$. The outer end of the member $d$ is formed with a conical knurled head $d^4$ which engages with a correspondingly shaped and knurled internal part at the outer end of the cover-piece $b^2$ the two parts being secured together by the screw $h$.

When the cover-piece or sleeve $b^2$ is rotated the member $d$ is also rotated and the shank $i'$ and movable jaw being incapable of rotation the said shank and jaw are moved longitudinally. When gripping pressure is put on the work the ball bearings take the pressure, there being thus but a minimum of friction between the parts taking the pressure; and the sleeve $b^2$ may be rotated with little effort until the gripping pressure of the jaws is very great as compared with similar tools as heretofore known.

Figure 2:
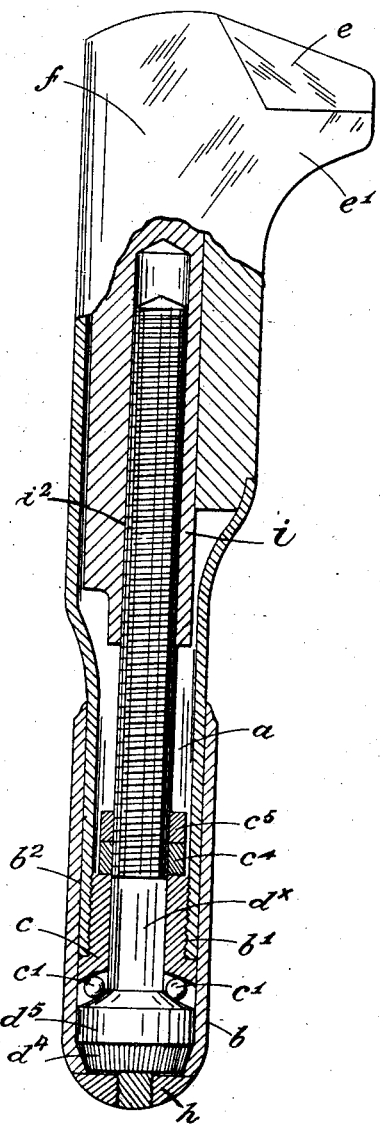
Fig. 2 is a side view partly in section of an adjustable spanner embodying one form of the said invention.

Fig. 2 illustrates an embodiment of the invention in an adjustable spanner. This embodiment differs in no essential respect from the construction illustrated in Fig. 1 but the details are somewhat different. Instead of the specific tubular member $d$ heretofore described, a solid externally screw-threaded rod member $d^x$ extends from a lower terminal enlargement $d^5$ having a conical knurled head $d^4$, operating similarly to parts $d^2$ and $d^4$ heretotofore described, the rod $d^x$ extending into a longitudinal bore $i^2$ in the depending shank $i$ of the movable jaw. A ring nut $c^4$ bears on the inner end of the ring $c$, said ring nut $c^4$ being screw-threaded and mounted on the member $d^x$ and is locked in position by a screw-threaded ring $c^5$. The ring $c$ is substantially the same as in Fig. 1, except that the enlargement $d^5$ is not formed as a part thereof but having a ball face as in the first construction, said ring being provided with recesses, and the ring nuts $c^4$ and $c^5$ provided with holes like the corresponding structures as disclosed by Figs. 6, 7, 13 and 14 for adjusting them by means of a suitable spanner-like tool. The head $d^4$ is secured in the sleeve $b^2$ by a screw nut $h$ engaged with an extension of the member $d^x$.

The details of construction shown by Figs. 1 and 2 may be varied and interchanged, and as an instance of this substitution the solid member $d^w$ shown in Fig. 4 may be used in the structure illustrated by Fig. 2.

The form of the solid member $d^w$, as shown by Fig. 4, is practically the same as the rod $d^x$ but embodies a collar $d^6$ similar to the collar $d^2$, shown by Figs. 1 and 5 as a part of the screw-threaded member $d$, the collar $d^6$ being spaced from the enlargement $d^5$ and connected to the latter by a waist member $d^8$.

Figs. 19 to 23 illustrate an embodiment of the said invention in a vise and embodies essentially the same structural elements as those shown in Figs. 1 and 2.

Instead of balls, rollers $c^2$ are employed arranged between races $c^6$ $c^6$ on the two parts $c^7$ and $c^8$ respectively corresponding and serving the same function as the collar $d^2$ of Figs. 1 and 5 and the enlargement $d^5$ of Figs. 2 and 3, and the ring $c$ of the said prior structures. The said parts or members $c^7$ and $c^8$ have a stem or rod member $d^7$ with a screw-threaded extremity $d^{10}$ operating as an adjusting means through the externally projecting operating part, as at $b^5$. The rollers have trunnions working in recesses $c^{12}$ on the part $c^7$. The projecting externally operating means $b^5$ is adapted to actuate the rotatory member $d^7$ and is the equivalent of the handle in an adjustable spanner or the like and the sleeve or coverpiece $b^6$ constitutes an extension of the part $b^5$.

The operation and function of the several parts, as shown by Fig. 19, is practically the same as in the preceding structures, the only difference being in the specific construction of the coöperating elements.

What I claim is:—

1. A tool having a fixed jaw, a movable jaw, a screw-threaded member engaging a part of the movable jaw for operating the latter jaw relatively to the fixed jaw, the member having a coöperating enlargement and an exterior actuating means for manual engagement, a ring device around the member in coöperative relation to the enlargement, and anti-frictional devices interposed between portions of the ring device and the enlargement.

2. A gripping tool, comprising a tubular body, a fixed jaw and a handle, a slidable jaw with a shank movably mounted in the body, a cover grip on the handle for operating the slidable jaw and its shank, a screw-threaded rod engaging the shank and provided with an enlargement at its rear end formed with a conical face, the cover grip and enlargement of the screw rod having inter-fitting roughened conical surfaces, a ring secured to the handle and through which a smooth portion of the screw-threaded rod extends, the ring having a conical end in opposition to the conical face of the rod enlargement, and anti-frictional devices interposed between and engaging the conical end of the ring and conical face of the enlargement.

FRANK HUMPHRIS.

Witnesses:
    ERNEST LAFFERTY,
    GEORGE HARRISON.